United States Patent
Jorswieck et al.

(10) Patent No.: US 10,314,109 B2
(45) Date of Patent: Jun. 4, 2019

(54) METHOD FOR MANAGING AVAILABLE COMMUNICATION RESOURCE IN A COMMUNICATION NETWORK AND NODE FOR A COMMUNICATION NETWORK

(71) Applicant: TECHNISCHE UNIVERSITÄT DRESDEN, Dresden (DE)

(72) Inventors: Eduard Jorswieck, Dresden (DE); Siddharth Naik, Zürich (CH); Janis Nötzel, München (DE)

(73) Assignee: Technische Universität Dresden, Dresden (DE)

( * ) Notice: Subject to any disclaimer, the term of this patent is extended or adjusted under 35 U.S.C. 154(b) by 0 days.

(21) Appl. No.: 15/760,190

(22) PCT Filed: Sep. 7, 2016

(86) PCT No.: PCT/EP2016/071054
§ 371 (c)(1),
(2) Date: Mar. 14, 2018

(87) PCT Pub. No.: WO2017/050574
PCT Pub. Date: Mar. 30, 2017

(65) Prior Publication Data
US 2018/0270905 A1    Sep. 20, 2018

(30) Foreign Application Priority Data

Sep. 23, 2015  (EP) .................................... 15186512

(51) Int. Cl.
*H04W 92/20*  (2009.01)
*H04W 28/18*  (2009.01)
(Continued)

(52) U.S. Cl.
CPC ........... *H04W 92/20* (2013.01); *H04W 28/08* (2013.01); *H04W 28/18* (2013.01); *H04W 28/26* (2013.01); *H04W 36/26* (2013.01); *H04W 76/15* (2018.02)

(58) Field of Classification Search
CPC ..... H04W 92/20; H04W 76/15; H04W 28/08; H04W 28/26; H04W 36/26
See application file for complete search history.

(56) References Cited

U.S. PATENT DOCUMENTS 9,084,179 B2    7/2015  Visuri et al.
2008/0031192 A1*    2/2008  Narashimha .......... H04L 12/66
                                            370/331
(Continued)

*Primary Examiner* — Christopher M Crutchfield
*Assistant Examiner* — Tito Q Pham
(74) *Attorney, Agent, or Firm* — Lewis Roca Rothgerber Christie LLP

(57) ABSTRACT

Method for managing available communication resources in a communication network and node (100, 200) for a communication network The invention concerns a method for managing signaling duties in a communication network and a node for a communication network, the node comprising a resource management. The method comprises using at least one signaling duty concerning a requested service for allocating corresponding communication resource of one of the nodes (200), the signaling duty being assigned to a different, further node (100) and the one node (200) being capable for at least partly providing the service. The method further comprises using the one node and the further node for determining a compensation and providing the compensation to said one node.

14 Claims, 4 Drawing Sheets

(51) Int. Cl.
*H04W 28/08* (2009.01)
*H04W 36/26* (2009.01)
*H04W 76/15* (2018.01)
*H04W 28/26* (2009.01)

(56) References Cited

U.S. PATENT DOCUMENTS

| | | | |
|---|---|---|---|
| 2008/0040481 A1* | 2/2008 | Joshi | G06Q 30/00 709/226 |
| 2008/0261602 A1* | 10/2008 | Livneh | H04W 84/045 455/442 |
| 2009/0154415 A1* | 6/2009 | Park | H04W 72/10 370/329 |

\* cited by examiner

METHOD FOR MANAGING AVAILABLE COMMUNICATION RESOURCE IN A COMMUNICATION NETWORK AND NODE FOR A COMMUNICATION NETWORK

CROSS-REFERENCE TO RELATED APPLICATION(S)

This application is a National Phase Patent Application and claims priority to and the benefit of International Application Number PCT/EP2016/071054, filed on Sep. 07, 2016, which claims priority to European Patent Application Number 15186512.8, filed on Sep. 23, 2015, the entire contents of all of which are incorporated herein by reference.

The current invention relates to voice and data communication, and to devices, systems, and methods for providing communication services in various forms. More particularly the current invention concerns a method for managing available communication resource in a communication network and a node for a communication network.

BACKGROUND

Communication services, particularly wide range communication services also termed telecommunication services, are extremely important to businesses and individuals. Especially connections via mobile devices such as handhelds, tablets or laptops are becoming increasingly important. They offer communication links between people at any time, and at any distance no matter how far. Not only people need to communicate but also other devices such as cars or trains are exchanging information for a variety of reasons and in a variety of ways. Apart from enabling machine to machine communication and voice calls, communication services allow people to connect with each other in a variety of ways, including video conferencing, email and text messaging. They give access to an abundance of information via the World Wide Web, and cover such basic things as emergency calls as well.

It can be seen that, over the decades, especially cellular communication is driven by two opposing principles: cooperation and competition. A lot of technical issues arising for example from interference between the electromagnetic signals used in cellular networks can be overcome using suitable synchronization (cooperation), and this applies to coverage as well: a cellular network does usually not provide perfect coverage for example over the whole area of Germany. It can be assumed that one cellular network and another cellular network which are deployed within Germany would provide good coverage in possibly different areas of Germany. It would be good if a telecommunication device could fluently switch between the two networks. This would require cooperation between the two networks.

It is however a tragedy of the human nature only to need competition in order to derive best results. Therefore, telecommunication network providers are usually forced to compete by the law. This necessitates a restriction of the flow of information in between their networks, and that again complicates synchronization and the fluent transition of mobile devices.

The present invention overcomes one mayor problem by allowing telecommunication networks to interact with one another using a pre-defined protocol containing technical specifications. The protocol can be made to obey the laws in each country, so as to allow the maximum amount of cooperation without any limitation on competition.

A communication device is a device through which at least some communication service can be used. A mobile communication device is any communication device that is able to send or receive information, at least, via electromagnetic waves and, optionally, via cable. A very common example of a mobile communication device is a handheld device.

Mobile communications is a part of communications where parts of the physical distance between the communicating parties are bridged via electromagnetic wave propagation which is not physically restricted via the boundaries of a cable. As mobile communications becomes more and more available, businesses as well as the private lives of people start to depend more and more on the availability of such services. At the same time more and more data gets routed through mobile networks, the data amount routed growing at an exponential rate. This increases the probability of not being able to get an important service when necessary.

A heterogeneous network is a network where different access technologies may be used for the same task and/or the different tasks, and where the choice of one access technology may not only depend on the information to be transmitted but also on the availability of the various technologies at a given moment.

Communication networks are composed of multiple communication network nodes. Each communication network node can be connected with the rest of the network via interfaces that enable the exchange of information. Different modes of transmitting information are possible. For example these are direct communication links which are used solely between two communication network nodes. Another example is broadcast links that enable a multiplicity of communication network nodes to receive information from one communication network node. It is also possible that a communication network node other than the intended receiving communication network nodes extracts part or all of the information that is being transmitted by a communication network node (eavesdropping).

In today's communication networks there are two predominant types of interfaces: Air interface and backbone.

A backbone connection typically connects communication network nodes that exchange information amongst each other in a controlled fashion and that are all contained in one sub network which is legally owned, leased or at least operated by one communication carrier or multiple carriers under certain service provision acknowledgements. A backbone connection is typically provided via cable or microwave link. Its main characteristic is that its endpoints are physically fixed.

An air interface connects communication network nodes within one network in a dynamic fashion. Examples of air interfaces are 2G, 3G or 4G. An air interface provides a flexible interface. The endpoints of a connection that is established via air interface are typically not physically fixed. Exceptions from this rule of thumb are given by microwave links. In today's networks, an air interface typically connects a base station to a mobile device.

The transmission of signals carrying information such as voice and data is carried out using electromagnetic waves. As is well known, such signals can be decomposed into linear combinations of other signals having that can be associated a number, which is their frequency. The transmission of radio signals is strictly limited by the law, so that for example one telecommunication provider may only be allowed to transmit signals that are not detectable on a huge portion of the spectrum: They are said to be bandlimited. A telecommunication carrier typically owns a license that allow him to use a variety of technologies and emit a variety of signals that are limited to a certain band. In that case one can as well say that said carrier owns a spectrum license (for said band).

Spectrum licenses are a highly valued good, and only their possession allows the operation of a telecommunication network.

The dynamics within communication networks have become so fast that it is not possible for a human being to keep track of the establishment and breakdown of individual connections that are made, especially those made via air interface.

The role of a node in a communication network node can be either one or even both of: providing service and requesting service also called taking service. Examples of communication network nodes comprise base stations, mobile devices, radio network controllers or the backbone. Another widely accepted separation is that into the radio access network and the core network. Future mobile networks will further diversify the picture by assembling large numbers of communication network nodes into a cloud radio access network.

Some communication network nodes can provide and take service at the same time. For example a communication network node (R) may serve as a relays: It receives information from one communication network node (A) and then sends this information to another communication network node (B). The transmission from (A) to (R) may be realized on a different connection, air interface or frequency than the one from (R) to (B).

The communication network nodes, also referred to simply as nodes thereafter, are typically organized within sub-networks (each sub-network belonging to a certain communication carrier). Within these sub-networks other distinctions may exist, for example a communication network node may be a mobile device, base station or radio network controller.

Within each (sub-)network, a hierarchy may exist that allows certain communication network nodes to control the behavior of other communication network nodes.

Services may have resource requirements. Throughout this specification, services having different resource requirements are considered different from each other. The resource requirements may, for instance, concern one or more of: real time requirement, overall data amount, duration, data rate, starting time, ending time of the service, maximal amount of jitter, overall data amount, duration, air interface, bandwidth, provision of a specific end-to-end connection (for example during a meeting, a highly prioritized connection may have to be available such as to contain virtual attendees). An important parameter of a service is the time at or during which it has to be delivered. This may be specified by a starting- and an ending date, but more complicated constructions such as periodic delivery (e.g. LTE air interface available each day in July 2015 from 12:00 to 16:00) are possible.

Another set of potentially important parameters are geographic boundaries.

Services are provided by nodes by carrying out signaling duties concerning the service.

A node may comprise a resource management configured for using resource requirements of a requested service, the service being requested by a user assigned to the node, for allocating communication resource such that the allocated communication resource does meet the resource requirements and the service can be provided by the node.

For example in order to deliver a service the service provider typically needs to be the owner of a spectrum license as well and the spectrum license needs to be written such that it allows the execution of the service.

In order to differentiate the transfer of signaling or service duties from resource trading one can imagine a very high wall (with a small door). The wall divides an area into a left side and a right side. In this area, a left node perfectly covers the left side of the wall and a right node the right side. In the picture described here, the signals of the left node are only poorly received on the right side and the signals of the right node are poorly received on the left side. Every user on one of the two sides is assigned to one of the two nodes. Users can and will change sides through the door. A user on the left side should receive its signals from the left node, even if it is assigned to the right node for example through a contract.

The present invention further aims to unify both resource trading and the trading of signaling duties or services. Speaking in terms of above picture, it may for example be that the left node has the right to operate on all radio frequencies between 1 and 2 GHz and the right one has the right to operate between 2 GHz and 3 Ghz. Then, if all users are located on the left side, they may all receive service from the left node but the left node's bandwidth could be exceeded. In that case, in order to deliver a service to all users the right node could grant the left node the right to use the frequencies from 2 to 3 GHz, thereby dramatically increasing the left nodes capability of providing service. Therefore, the user trading protocol may execute, use parts of or make reference to a further protocol that handles the allocation of resources between different telecommunication networks.

Prior art useful for understanding the invention is described in US2008/031192 A1 and US 2008/04081 A1.

SUMMARY

The current invention proposes a method according to claim 1 for managing available communication resource in a communication network, a node according to claim 7 for a communication network and an end user device according to claim 10. The network comprises nodes each node comprising a resource management. The method comprises: using resource requirements of at least one signaling duty assigned to a different, further nodefor allocating corresponding communication resource of one of the nodes, the one node being capable for carrying out the at least one signaling duty. The method further comprises using the one node and the further node for determining a compensation and providing the compensation to said one node. The compensation concerns at least one different service which at least differs in one of: real time requirement, data rate, over all data amount, starting time of the service, ending time of the service, quality of service and service duration wherein quality of service concerns a required data rate and a ratio of the data rate of the at least one different service to that of the service is proportional to a ratio of the service duration of the service to that of the at least one different service and wherein a proportionality factor of the ratio of the data rates to the ratio of the service durations depends on cumulative resource requirements of further services being or being to be provided at least partly contemporarily with the service.

The method enables trading of signaling duties between nodes. That is, in exchange for allocating an amount of resource for a given service, a node is provided with a compensation, for instance, by guaranteeing to it that a specific service that it may require (potentially on behalf of a user that is assigned to it) in the future will be given to it by the different node.

Thus, a trading becomes possible in which only the duties to provide certain signaling duties or services are exchanged. In embodiments, appropriate compensation for allocating resources for the given service may be negotiated, optionally iteratively, or determined in a kind of stock exchange. For instance, the compensation may depend dynamically on a number of concurrent requests and/or the number of nodes being capable of providing the service. The number of concurrent requests and/or the number of nodes may be determined by each node individually. Additionally or alternatively, this information is determined by one of the nodes and communicated to other nodes.

Additionally or alternatively, the execution of the protocol may make reference to, activate or incorporate a further protocol which handles the allocation of the resources. For that matter, an interface towards said further protocol enables the exchange of the relevant information or data during the execution of the user trading protocol. Further, a resource occupation occurring simultaneously with the service can be taken into account.

Particularly, the at least one different service may differ only in the starting time. Then, equal amounts of the resource are allocated to the service and to the different service.

The service may be requested from and agreed to by the further node, the method further comprising determining said one node. This further increases flexibility in the response to service requests Determining the one node may comprise communicating a request message requesting provision of the service from the further node to the one node and communicating an acceptance message indicating acceptance of the communicated request from the further node to the one node. The request message may comprise constraints required to be met and/or information required to be known for being capable of carrying out the signaling duty.

Determining the one node may comprise communicating a suggestion message suggesting compensation from the one node to the further node in response to the request and communicating an acknowledgement message indicating acknowledgement with the suggested compensation from the further node to the one node.

Additionally or alternatively, the request message may comprise a suggestion suggesting compensation. Then, the suggested compensation may be accepted by the acceptance message. Additionally or alternatively, an alternative suggestion message suggesting an alternative compensation may be communicated from the one node to the further node in response to the request message and an acknowledgement message indicating acknowledgement with the suggested alternative compensation may be communicated from the further node to the one node The compensation may concern a commitment of the further node for provision of at least one different service.

The compensation may concern a commitment for provision of at least one different service said commitment being agreed on as compensation for the further node providing a yet different service for which a corresponding user request was accepted but not by the further node. The commitment may be one of the node or of a yet further node.

The node proposed by the invention comprises a resource management configured for managing available communication resource of the node and adapted for using resource requirements of a requested service for allocating communication resource The allocated communication resource does meet the resource requirements and is allocated for said service. The allocated communication resource is allocated in exchange for a compensation received from the different, further node, and the node being configured for at least one of: suggesting the compensation to the further node or accepting a suggested compensation suggested by the further node. The compensation concerns at least one different service which at least differs in one of: real time requirement, data rate, over all data amount, starting time of the service, ending time of the service, quality of service and service duration wherein quality of service concerns a required data rate and a ratio of the data rate of the at least one different service to that of the service is proportional to a ratio of the service duration of the service to that of the at least one different service and wherein a proportionality factor of the ratio of the data rates to the ratio of the service durations depends on cumulative resource requirements of further services being or being to be provided at least partly contemporarily with the service.

In an embodiment, the node is configured for allocating communication resource in response to accepting a corresponding request for carrying out the signaling duty, the request being received in a request message received from the further node. The request message may comprise a suggestion suggesting the compensating management of resource which is accepted by the acceptance message or wherein the node is configured for communicating the suggested compensation to the further node in response to the request message. The node may be configured for executing the method according to the invention or one of its embodiments.

The end user device according to the invention is configured for a communication network. Particularly, the device is configured for determining nodes of the network covering a geographical region in which the device is located and for requesting carrying out of a signaling duty concerning a service from one of the determined nodes wherein a request message requesting the carrying out comprises a list of the other determined nodes. In an embodiment, the end user device comprises means for storing and processing information relevant for user trading. For instance, the end user device comprises an additional processor interfacing with a processor of the end user device and further interfacing with a telecommunication carrier, one or more other mobile devices or a third party.

The information that is stored during user trading may be fed back to a telecommunication carrier or a third party, for example periodically, or after the end of the contract.

FIGURES

DETAILED DESCRIPTION

Figure 1:
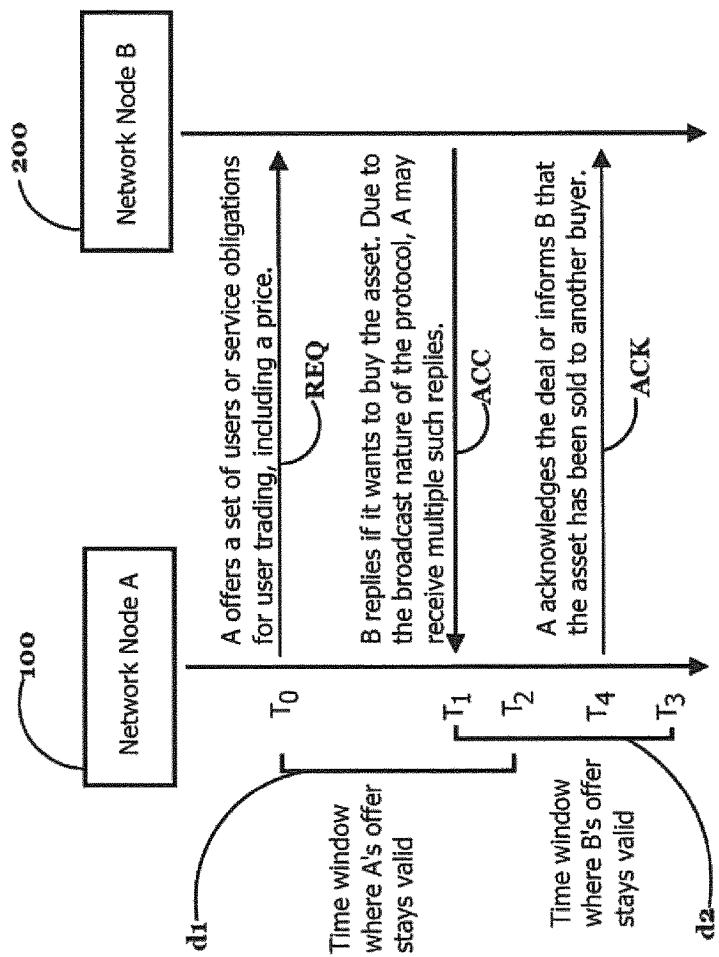
FIG. 1 shows an exemplary embodiment of the invention.

Embodiments of the current invention enable a fluent transition not only of access technologies but also of access providers.

Embodiments of the current invention enable nodes to delegate the duty to provide a given service to a specific user amongst each other in a controlled fashion. This allows even for delegating the duty between nodes of different communication carriers and/or nodes comprised in different, heterogeneous networks.

Under the present invention, a telecommunication service includes signaling duties such as the provision of pairs of possibly periodic signals that are synchronized in time, where the signals are emitted by one node and the one signal is received by a further node and the other signal by a yet further not. Such a process may enable the further and the yet further node to communicate with each other in a reliable fashion.

Another signaling duty would be the periodic emission of downlink information by one node covering a certain area. Such process enables mobile devices entering that covered area to receive this downlink information and adjust themselves such that they can reliably communicate with other nodes in that area.

Another aspect of the invention covers the case where one node, on behalf of a network that it is associated with, the network potentially consisting only of said node itself, takes over the duty to provide a complete telecommunication service for a telecommunication device. All the above duties are carried out within technically specified limitations. For example a node may guarantee to provide 4G service within the geographic boundaries of Berlin starting at 00:00 on a specified day and ending at 23:59 that said day.

A service may as well be the guarantee to provide all necessary steps for the execution of a voice call. A service may include the promise of delivering the service at a guaranteed quality, where quality is defined using an appropriate metric.

A service may be limited to the guarantee of receiving and further processing for example data packets containing among other data QoS indicators. The said other data may be suited to identify a number of nodes that interacted with certain other nodes. The QoS indicators and the other data may be encrypted. A node or network providing this form of guarantee may be termed a clearing layer. The data received and processed by a clearing layer is vital: As it gets fed back to the other communicating parties via different mechanisms, it ensures the system is functioning properly.

A service may even consist of a guarantee to restrict to a certain form of behavior. For example a network or node may issue a guarantee to use, on a given frequency band, only OFDMA and not CDMA. Another service may be to confine to a certain range of a specific parameter, for example to obey an energy constraint.

Embodiments of the current invention are based on a compensation for taking over the duty to provide a given service or signaling duty.

In some embodiments, the compensation concerns provision of a different service which differs from the given service by at least one of: starting time, real time requirement, data rate, data amount total, geographical boundary and duration.

The invention enables "trading" service obligations, for example signaling duties concerning the service, in exchange for compensations concerning communication resource. That is, a node having accepted a duty to provide a service may indirectly use current idle resources of a further node in exchange for a duty to provide a different service, for example a service of same quality at a later starting time. Similarly, a node having current idle resources can use them by allocating them to certain services that it provides to other nodes. Additionally or alternatively, this process enables the node to make use of future idle resources.

The invention enables signaling and service duties to be traded at any speed necessary to meet the network demand. The invention does not require human interaction and is dynamic in the sense that it can be executed independent of a user's current location.

The invention even enables a node not capable of providing a certain type of service to offer this service after having "bought" it from a different node. For example a node configured for huge data amounts but not for real-time can allocate current resources for a bulk data transfer requested by a real-time capable node in exchange for real-time resources and then provide real-time service by means of the other node's real-time resource.

An aspect of the current invention concerns so called broker nodes each being part of a (sub-) network for which the broker node trades services or signaling duties. For example the broker node may have been granted the right to allocate idle resources to services and signals on behalf of the rest of the (sub-) network.

The present invention offers the possibility to change the topology of communication networks in an on-demand fashion.

For the purpose of trading some exemplary embodiments of the invention use an interface between network communication network nodes. The interface is used for the exchange of data using a pre-agreed upon protocol. This protocol includes descriptions of network communication network nodes, locations, geographical boundaries and time, as well as all possible relations among them. Once a set of objects and their relations has been specified they form a language. The language enables the formulations of highly complicated relations between objects or conditions. Among the objects and conditions that are within the language of the trading interface (and, therefore, any UT-equipped network communication network node) there can be:

Data that unambiguously specifies a geographic region. In today's networks it may be sufficient to transmit for example GPS coordinates. In future networks this data may include an extended set of coordinates that additionally specifies height levels or space-time coordinates.

At times, other means of specifying a geographic region may be better suited for the method to work reliably. For example if the geographic region to be specified is a building or a room, this building or room may be known to the network communication network nodes taking part in UT. In that case, naming the building or room might be an appropriate replacement for the coordinates. Other examples include the boundaries of a city or of a state.

Intervals specifying exact moments in time.

Other conditions that may cause the change of service liabilities under an execution of UT include but are not limited to: Weather conditions, number of people within an area, specific serving communication network nodes entering an area, changes in stock prices.

The combinations of all such possible conditions and their interdependencies can be used to describe what is called a UT-asset in the following.

The interface is capable of transmitting and receiving a suggestion suggesting compensation in exchange for taking over or delegating the duty of providing a service.

FIG. 1 shows an exemplary embodiment of the invention. Exemplarily, two nodes 100, 200 covering a same geographical region are depicted. More nodes may be further covering the same geographical region.

At a time T0, a requesting node 100 sends a request message REQ to node 200 to provide a service which node 100 has accepted to provide. The service requires a certain communication resource. The request message REQ specifies the corresponding technical details required for providing the service. Hence node 200 can check whether the required resource is available at node 200 for providing the service and node 100 can send the request message in a broadcast fashion, i.e. without explicitly addressing node 200. The request message REQ of the example further comprises validity duration during which the request can be accepted. Alternatively or additionally, the request message REQ comprises an end time T2. End time T2 is by the validity duration after time T0. The request message REQ of the example yet further comprises a compensation suggestion for compensating the required communication resource. Given the node 200 has the required capability and resource it may respond with an acceptance message ACC accepting the request and the compensation suggestion at a time T1. The acceptance message ACC of the example further comprises a further validity duration during which the request can be accepted. Alternatively or additionally, the acceptance message ACC comprises a further end time T3. The further end time T3 is by the further validity duration after time T1. Node 100 acknowledges the acceptance message within the further validity duration at a time T4 by sending an acknowledgment message ACK. If more nodes are present covering the same geographical region several acceptance messages may arrive. Node 100 may acknowledge an earliest acceptance message arrived within the further validity duration, for instance. Node 100 acknowledges one of the acceptance messages within the respective further validity duration at a time T4.

In another exemplary embodiment, the request message does not comprise a compensation suggestion. Then, given the node 200 has the required capability and resource, it may respond, at a time T1, with an acceptance message conditionally accepting the request under the condition that a compensation suggestion comprised in the acceptance message is acknowledged by node 100. If more nodes are present covering the same geographical region several such acceptance messages may arrive. Node 100 may acknowledge that one of the timely arriving acceptance messages which suggests the most advantageous compensation.

Compensation may concern further resources of the requesting node to provide a different service. Then, compensation may be advantageous for the requesting node for different reasons: The different service requires less data rate, less total amount of data, a different starting time where node 100 is less occupied by other services or the like. Similarly, accepting can be advantageous for the accepting node 200 simultaneously because the current service fits better the resource and/or obligations of node 200, for example less further services are to be provided by node 200 concurrent with the service than with the different service.

In yet another example, the nodes are registered at a validation node with their resource. Then, the requesting node may pre-request a list of nodes capable of providing the service from the validation node and then send the request message to the nodes of the list. The request message then does not necessarily comprise the technical details corresponding to the service.

In even yet another example, negotiated compensations are further registered at the validation server and the pre-request concerns capability in view of already allocated resource.

Figure 3:
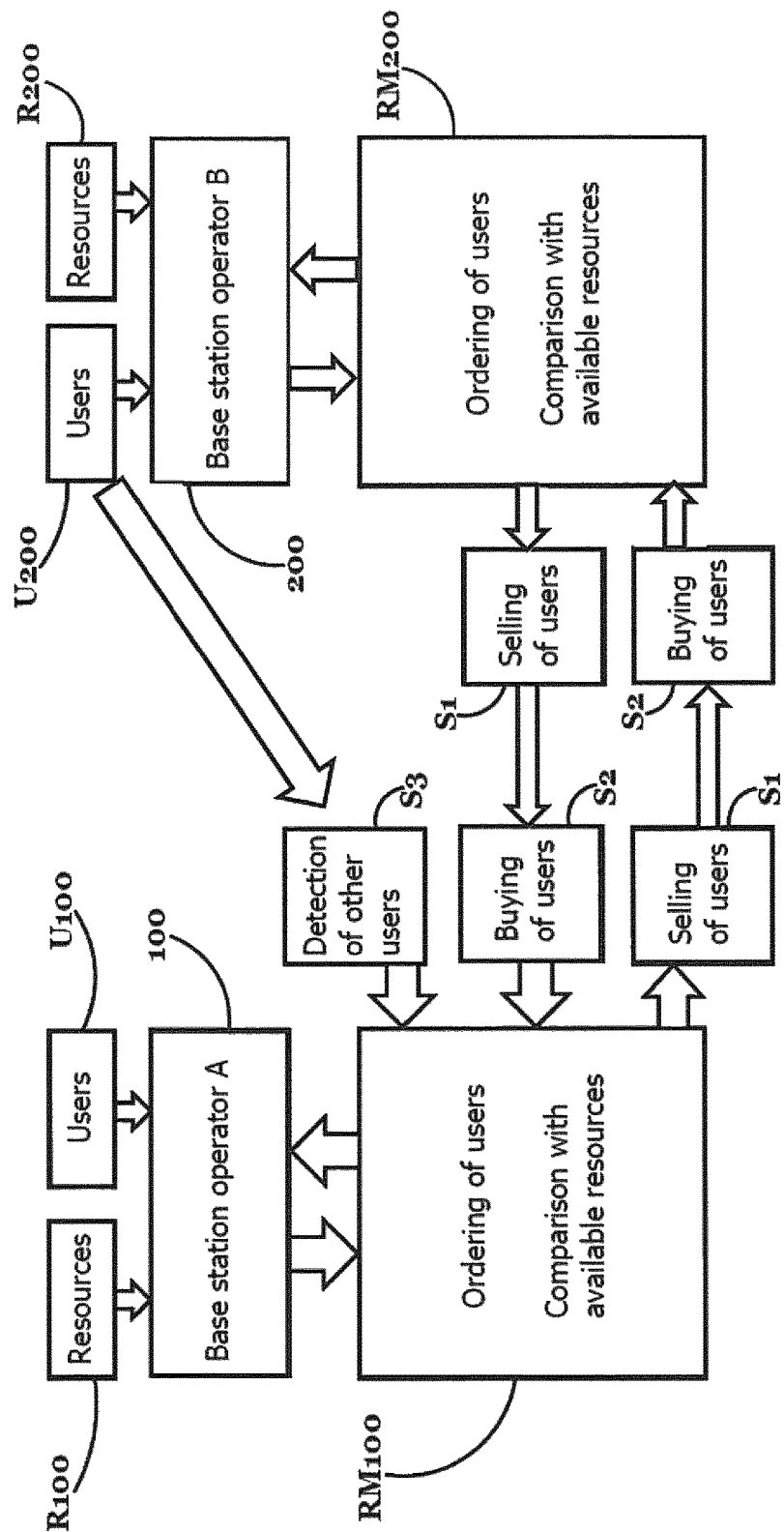
FIG. 3 shows a different exemplary embodiment of the invention.

FIG. 3 shows a different exemplary embodiment of the invention. Exemplary two nodes 100, 200 covering a same geographical region are depicted. More nodes may be further covering the same geographical region.

Node 100 has resource R100 and contracted users U100. Similarly, node 200 has resource R200 and contracted users U200. As well both nodes 100, 200 operate a resource management RM100, RM200. Each resource management RM100, RM200 orders services to be provided, determines resource required for the services and compares available resource with the required resource. This forms the basis for trading, with node 200, services interactively in interrelated steps S1 and S2 which concern offering a service and accepting and offered service. Optionally, contracted users U200 of node 200 are detected by node 100 in step S3. This may enable node 100 to make suitable offers to node 200 using the UT protocol.

Figure 4:
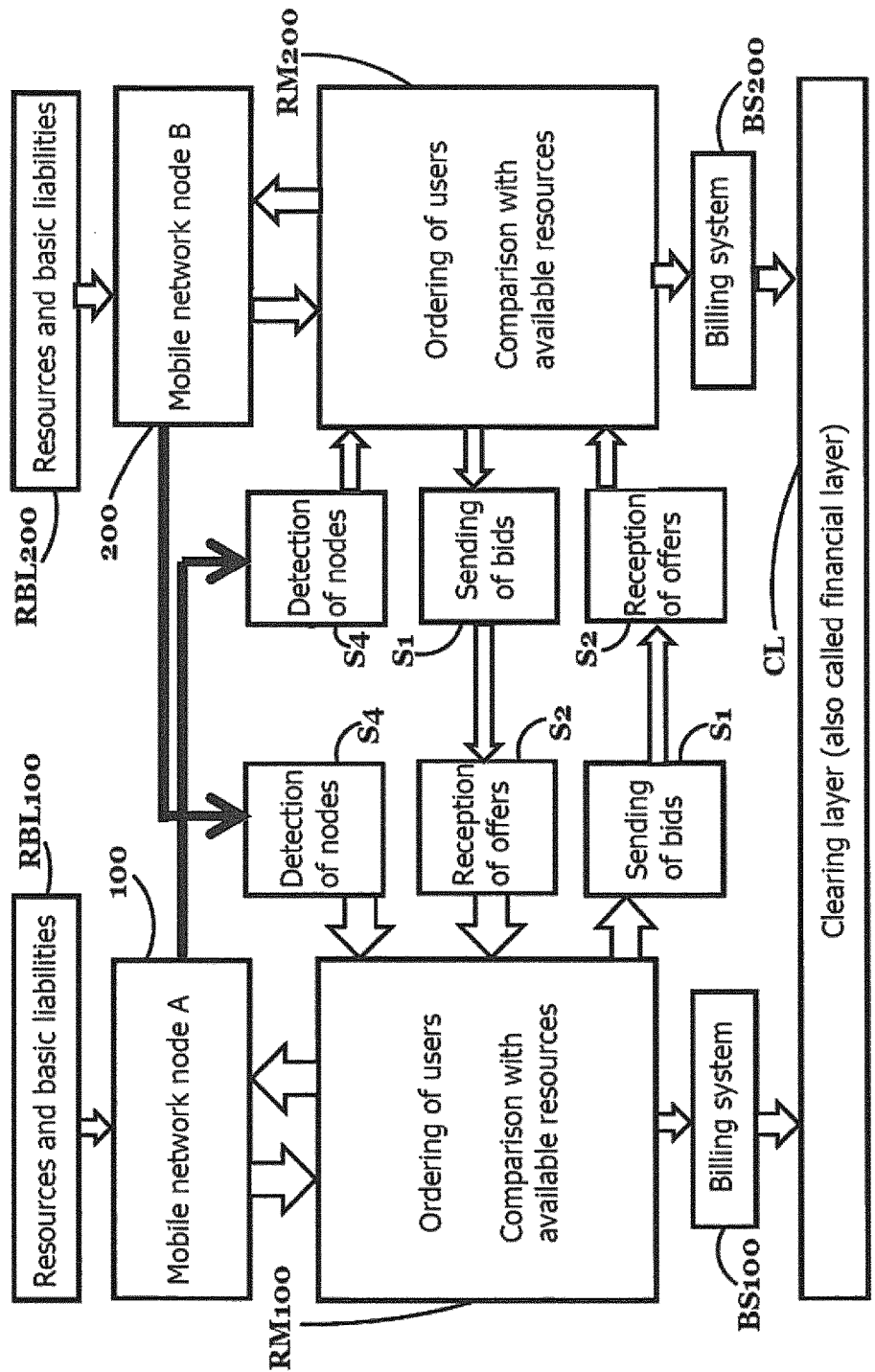
FIG. 4 shows a yet different exemplary embodiment of the invention

FIG. 4 shows a yet different exemplary embodiment of the invention. Exemplarily, two nodes 100, 200 covering a same geographical region are depicted. More nodes may be further covering the same geographical region.

Node 100 has resource and basic liabilities RBL100 and contracted users U100. Similarly, node 200 has resource and basic liabilities RBL200 and contracted users U200. As well both nodes 100, 200 operate a resource management RM100, RM200 enabling an ordering of users and/or services in view of available resources. Each resource management RM100, RM200 orders services to be provided, determines resource required for the services and compares available resources with the required resource. This forms the basis for trading, with node 200, services interactively in interrelated steps S1 and S2 which concern offering a service and accepting and offered service. Optionally, nodes 100 and 200 detect each other in step S4.

Each node comprises a billing system BS100, BS200. The billing systems interact with each other over a clearing layer CL. Such a step is advantegous in order to form a basis of trust: For example after the end of a contract wherein an end user device associated to node 100 has been completely served by node 200, node 100 would like to assure that the service has been carried out according to the contract. To that end, the user device transmits the content of its billing system to the clearing layer. The exact form of this layer is not specified further.

A further exemplary embodiment of the invention provides a method of delegating the duty to execute a specific service to a telecommunication device. The duty is delegated from one telecommunication network node, sub-network or network to the telecommunication device. The device may for example: be assigned to a node 100, and ordered by that node to observe certain signals of a node 200 in a step 2. Prior to that, in a step 1, node 200 may have agreed to send these signals, using the UT protocol together with node 100. The contract of step 1 may include the option that the user device gets assigned to node 200 only if the signals of node 100 can be clearly detected.

The method optionally applies to the delegation of service obligation from one telecommunication carrier to another telecommunication carrier. The method includes submitting to one or more telecommunication network nodes a proposition that may contain legal details of a contract along with a bid concerning an exchange of telecommunication data, receiving offers from the telecommunication network nodes, clearing the trade and executing the handover to the contract taker.

Since the method specifically applies to current telecommunication networks it includes the communication of bids from one telecommunication carrier to another communication carrier with the aim of being chosen to provide service to telecommunication devices which are currently being serviced by that telecommunication carrier.

In the following, the process which is used to clarify the roles and liabilities of network nodes among each other is explained in detail. Special focus is put on the current network topology. In particular, reference is made to the role of the node taking the service as the "communication device" or "mobile device". The more general case will be outlined as well.

Embodiments of the present invention offer the possibility to change the topology of telecommunication networks in an on-demand fashion. For instance, it becomes possible for one node to transfer all its service liabilities at some point T in time to one or more other nodes in exchange for taking over corresponding, for example all, service liabilities of the other node, starting at another point T' in time which satisfies T'≠T, for instance T'>T.

A further exemplary embodiment concerns a method of delegating the duty to provide a specific telecommunication service to a telecommunication device. The duty is delegated from a telecommunication node to a further telecommunication node. The method comprises submitting to one or more telecommunication nodes including the further node a proposal including a bid, for example concerning Node A committing to a service obligation towards B, as well as technical details such as duration, geographic boundaries, quality of service constraints, and optionally legal details, such as break clauses and terms of payment;

receiving from at least one of the one or more of telecommunication nodes an offer to provide the requested service;

automatically selecting one of the telecommunications nodes from the nodes submitting a bid, and performing the handover of the service to that telecommunication node;

continuing to provide service to the telecommunication device if no offer was received or is selected.

The method includes the transmission of offers or requests describing telecommunication resources, the exact form and nature of these requests being described in a further document. Thus it becomes possible to formulate joint transactions, involving not only for example the handover of one telecommunication device from one network to another, but also granting, for example at the same time, the necessary rights to use for example a frequency band that this user is currently occupying.

Such joint trading procedure may greatly simplify the transaction from a technical perspective as the telecommunication device does not have to tune its receiver to another frequency.

In an embodiment, the method may comprise going through a billing procedure for clearing service obligations, for example according to a pre-established contract.

The execution of this method is henceforth called user trading (UT).

The method includes the case where a network node A, using UT, enters a legal contract with another network node B, thereby making B liable to the provisioning of a certain service towards another node C which may even be A itself.

The method may further comprise determination of the availability of the one or more of telecommunication nodes to a portable communication device.

The automatic selection of one of the buying telecommunication nodes can comprise the selling telecommunication node evaluating bids and/or quality indicators.

The automatic selection can comprise selecting the offering node that submits the most advantageous offer. Optionally this involves taking regard to the quality of service (QoS).

For example the automatic selection chooses a tradeoff between the best bid and other offers that may have higher bids but offer better QoS.

The telecommunication nodes involved can be part of an IP-based network, a public access point or a mobile communication device, for instance.

The method includes transmission of UT related data from one network node to other nodes, not only but also transmission from one telecommunication carrier to other telecommunication carriers.

The method includes reception of UT related data at a telecommunication network node, not only but also when this node belongs to the network of a telecommunication carrier.

The invention defines an interface between telecommunication network nodes to execute trades based on information communicated via the interface.

An aspect of the invention concerns a device for reception of radio signals with the purpose of identifying network nodes, specifically mobile devices, with the aim of submitting a service proposal to them or their carrier.

Another aspect of the invention concerns a device or interface for the reception of radio signals or functions thereof wherein the device has the purpose of detecting network nodes, specifically control units of other telecommunication carriers that are able to offer a specific service to a mobile device.

The aforementioned devices can, optionally, further comprise a bid confirmer to verify, to a telecommunication connection coordinator, parameters of a completed trade.

Yet another aspect of the invention concerns a method of completing a telecommunication connection. The method comprises sending a signal to a mobile device or other network node indicating the necessity to connect to a different telecommunication carrier or network node. Additional information may be sent such as a frequency band, a transmission mode or a base station identifier but this is optional. The method further includes sending a signal to a telecommunication carrier or network node revealing data such as the identity, exact position, equipment and channel being used by the mobile device or other network node for setting up the connection. The method may make use of existing protocols by activating them in an appropriate fashion, e.g. X2 for handover in LTE.

The method of embodiments includes a billing system. Then legally binding contract details are transmitted during the submitting of a proposal. Such legally binding details form the basis of user trading. Once a user is traded, this trade is based upon legally binding statements. These statements may contain an agreement concerning resource management control that is to be transferred between the parties taking part in the contract, once certain events happen.

These events include but are not limited to: taking the duty to provide service to a user with delivery upon request by that user.

Each telecommunication carrier stores contract and contract violation data within its billing system. The billing system may consist of several parts, not all of which are part of the actual telecommunication network. The billing system may be installed in networks other than those owned by a telecommunication carrier, especially in small local networks or networks that consist of only one node. A telecommunication device may use its billing system to store QoS indicators in a possibly encrypted way, in order to make them available to a specified party after the end of a contract.

The method specifically applies to current networks, where a large separation exists between nodes that provide service (for example base stations) and nodes that take service (for example mobile devices). A mobile device may be equipped with components that are adapted to its role in the network. Thus the method may include an additional computing unit.

This unit may be realized by a processor that is attached to or incorporated into the mobile device.

The additional computing unit may also be separated from the mobile device. The additional computing unit may be enabled to exchange information with the mobile device via an interface. The additional system may have an additional interface that is enabled to connect to a telecommunication carrier, to another mobile device or to a third party.

The additional computing unit may be used to store and send data which contains information that is relevant for user trading. This data may include QoS indicators.

For use in current network topologies with a strong separation between control units and mobile devices, the method includes in embodiments the use of detection mechanisms using the device for reception of radio signals, whereby mobile devices other than the ones which are already connected to one particular telecommunication carrier, can be located. The information which is being acquired via such detection mechanisms can be used to make bids for offering service to a particular mobile device, even if that device may not have been selected to be offered for UT yet.

A particular instance of such monitoring activity is the observation of information that the mobile device provides for its network, especially regarding buffer status and downlink channel quality, as well as neighboring cell measurement information to enable E-UTRAN to select the most appropriate cell for the mobile device. These measurement reports are known to include cells using other frequencies or RATs. In order for detection to work properly, it is not necessary to decode this information, so that privacy may be maintained if necessary.

There is a particular realization where the mobile device itself detects the service nodes that are available in its vicinity, reports them back to the carrier that it is currently supported by and can then—through that carrier—be handed over to a potentially different carrier.

In a particular realization the mobile device is, by the telecommunication carrier it is currently attached to, commanded to detect service nodes that are available in its vicinity. The device then reports back to the carrier. The information that is gained in the process can be utilized as an input for nodes of different carriers that wish to trade the telecommunication device during an execution of UT.

In another realization the connection between the device and other networks may be such that the device receives detection commands only from one sub-network or node which owns the right to do so. For example a telecommunication carrier may reserve to himself certain service provisioning rights that include the allowance to command the telecommunication device to perform detection procedures or handovers as a part of user trading. He may also reserve to himself the right to access the billing system of the telecommunication device.

Hence, mobile devices or other network nodes may operate simultaneously on multiple networks in a controlled and reliable way. A telecommunication carrier may collect a subset of mobile devices for UT. It may bid clearly specified service obligations for these devices to other operators or equivalently it may "buy" the right that these mobile devices are served by other operators for a clearly specified duration with a certain QoS. A telecommunication carrier may signal to other carriers that it may be able to serve additional users, thereby inviting them to bid service obligations.

A service obligation may end during the transmission of data to—or from the mobile device. In that case, handover is performed during transmission. The method includes the case where, from a technical point of view, the transmission is terminated first and then re-established (hard handover).

A telecommunication carrier may engage into a fixed contract with another telecommunication carrier, so that mobile devices are subjected to UT under pre-defined circumstances. Embodiments of the method according to the invention may still be used for the execution of the corresponding handover.

As an example, when a mobile device enters a mall, the telecommunication carrier providing service outside the mall may not be able to provide service inside the mall as well. It may therefore seek to use UT to perform a handover to the network inside the mall. As another example a mobile device may be connected to and receive service from a short-ranged base station operating at high frequencies. When the mobile device is about to exit the service area of that base station, that particular base station may use UT to perform a handover to a different telecommunication carrier's base station whose UT equipment signals that it will guarantee a certain QoS for a specific time period at a certain price. If the service does not get carried out according to contract, the device sends a corresponding signal to the telecommunication carrier it was connected to before.

Figure 2:
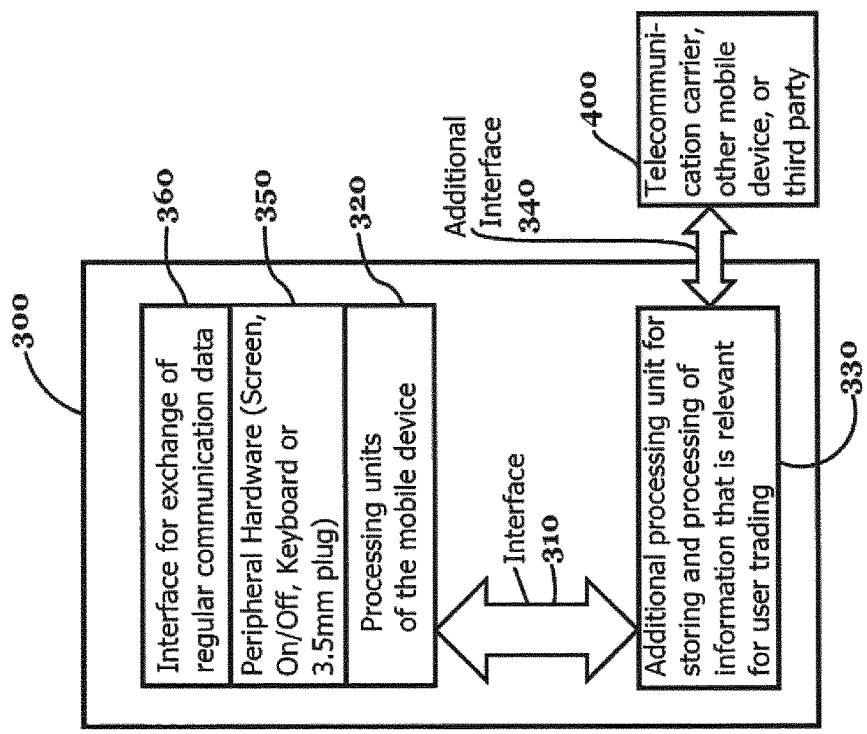
FIG. 2 shows an end user device according to an embodiment of the invention.

In one embodiment the end user device according to an embodiment of the invention is a mobile device including an additional processor as exemplarily depicted in FIG. 2.

The mobile device 300 is configured with an internal interface 310 internally interfacing processing units 320 of the mobile device 300 with an additional processing unit 330. The additional processing unit 330 is interfaced via an external interface 340 with an external unit 400, for example a telecommunication carrier, another mobile device, and/or a third party. The mobile device 300 may comprise peripheral hardware 350 for user interaction, for example a screen, an on/off-switch or a plug such as an USB-plug, a 3.5-mm plug or the like. Additionally, the mobile device 300 may comprise an interface 360 for exchange of regular telecommunication data, e.g. speech, video or internet content.

The additional processor 330 may have separate memory to store and manipulate data. The additional processor 330 may additionally have an interface which is enabled to receive and process UT related data from telecommunication network carriers 400. The additional interface 340 may be able to connect to third parties which are not necessarily telecommunication carriers themselves. The method includes the case where the actions of the additional processor are simulated by the mobile device or by an external device with the respective interface or interfaces.

In one embodiment of the method, the processor or its simulation are able to store contract data during an execution of UT. The contract data may be received via the interface to the bidding telecommunication carrier. The processor or its simulation can also receive information from the telecommunication device that is suited to derive from it QoS indicators. The QoS indicators can be transmitted to a telecommunication carrier or other recipient using the additional interface.

The method includes the establishment of a connection which lets a telecommunication device transmit UT relevant data to the network of a telecommunication carrier, during or after UT has been performed. In particular, this telecommunication carrier may be the telecommunication carrier that a user has signed a contract with. This ensures that data which is necessary for accounting purpose (billing) reaches the sub-ledger of the telecommunication carrier (for accounting purposes). In a current network, this connection is established via a base station. From there, the information gets routed towards the core network of the telecommunication carrier. Thus, one possible route that the information can be transmitted along is from the device to a BS to the RNC to the RAN and then to the sub-ledger.

Examples of break clauses which are to be considered technical from the perspective of telecommunication engineering comprise failure of delivery of agreed upon amount of data within an agreed-upon amount of time and departure of a mobile node from the agreed upon service area. Examples of non-technical break clauses comprise failure of the operator of the control unit involved as a buyer in the trade to meet credit clauses and occurrence of interest rate alterations between the trade time and the settling time causing a change in the price adversely affecting the operator of the control unit involved in the trade as a seller.

If a service is not carried out as specified during an execution of user trading, a telecommunication device may report this using data that is stored in the processing unit 330, with the address of the report being an agreed upon entity, for example its carrier.

Some merits of the present invention concern the increase of the utility of mobile networks by inter-operator handover. The necessary signaling is carried out via additional interfaces. Early communication standards mainly used the backbone for handover. For example 4G has a much more flexible interface (X2) whose physical realization is not bound to either cable or wireless connection. X2 even allows the coordinated servicing of one UE by multiple eNodeBs. The present invention provides the possibility to extend this procedure to inter-operator service in a flexible, standardized and scalable manner.

Under use of the present invention, the current role of telecommunication carriers is expected to change. Specifically the ties between mobile devices and the telecommunication carrier that was selected by their owner will remain only virtually. From the system perspective, the mobile device will be able to switch fluently between available service resource portions in networks that are equipped to use user trading. While the telecommunication carrier loses some control about the physical process of information transmission itself, the business relation between him and his customer stays intact.

This may for example be guaranteed by giving access to the billing system of one communication device only to its network provider.

Aspects of some exemplary embodiments of the present invention include the possibility of a mobile network node of acting autonomously; transmitting only its liabilities and cash flow towards the clearing layer. In that case, the only thing remaining for the network operator to guarantee will be the attachment of the network node to the clearing layer or other basic services like emergency calls.

Aspects of some exemplary embodiments concern user-trades which are over-the-counter trades, i.e. peer-to-peer trades. Optionally an exchange may come into play at a later stage. The invention can be applied to device-to-device (D2D) and to machine-to-machine (M2M) communication, wherein the influence of the user on the necessity of the multiple different services becomes less specific.

In one further exemplary embodiment of the method, mobile network nodes of various design forms may interact using the interfaces according to the invention. Particular physical realizations of the interfaces may include cable connection and air interface. The billing system may connect the nodes to what will be called the clearing layer. On this layer, resource management ownership and settlement (e.g. cash) are organized. This may be done for example via end of day settlement.

A yet further exemplary embodiment of the invention realizes a method for managing signaling duties concerning services within a communication network of at least two nodes. Each of the nodes comprises a resource management, and a service duty management. The method comprises, for each node, using resource requirements of a multiplicity of at least one requested signaling duties and available resource management data in order to provide a ranking for the requested signaling duties. Hence, some of the requested signaling duties are ranked more favorable than others. The method also comprises bidding those of the signaling duties that are deemed less favorable to the other node. The ranking is technical in the sense that it enables an automatized decision making.

The one and/or the other node may acts as broker nodes on behalf of a (sub-)network of nodes.

As part of the bidding process, one node uses an interface to send a bid message to the requested signaling duties to another node which is enabled to receive them via its corresponding interface and to respond towards the one node using the corresponding interface, in order to signal that it will take over the duty to provide the requested signaling duties. The one node receives this message via the interface. The other node may as well not respond or respond, but decline to take over the signaling duties. The other node may as well offer to provide parts of the signaling duties.

The method may rely on a detection mechanism capable of either directly or indirectly receiving signals indicating the presence of further network nodes with certain signaling duties requests or promises. The detection mechanism, if present, is connected to the respective signaling duty management system. Advantageously but not necessarily, the signaling duty management system ranks the detected further nodes, for example by taking into account the available resources at the further nodes.

The nodes of a communication network may be configured for sending ask requests signaling willingness to take over certain signaling duties, i.e. indicating to further nodes the opportunity to transfer duty to the node sending the ask request.

The ask request or the bid messages may contain suggestions concerning a compensation of the one node taking the duty. Additionally or alternatively, the response may comprise a suggestion for compensation.

Bid message, ask request and/or response can be provided with validity time intervals during which the bid, the request and/or the response stays valid.

The one node sending the bid message can specify an acceptance region of parameters indicating that the duty to provide a service can be taken over within that whole region.

A clearing layer may be present in the system for directly or indirectly connecting the nodes for example via their signaling duty management systems.

In an even yet further exemplary embodiment signaling requests are coming from end user devices of a telecommunication network. Each of those end user devices is able of demanding some service, with each of the services being guaranteed to be provided by at least on node. The duty to provide the different services is allocated between the nodes.

The end user device may comprise means for communicating to other determined nodes a request message requesting provision of the signaling on behalf of the one determined node and for communicating an acceptance message indicating acceptance of the communicated request from at least one of the other nodes to the one node.

The resource management systems may be configured for automatically computing contract parameters, for instance by using a predefined set of parameters. The parameters can be, for instance, geographic boundary specifications, points or periods in time, air interfaces, data rates and other QoS indicators.

Exemplary embodiments of the invention concern a telecommunication device comprising a billing system being able to store and send data, optionally encrypted. The data can include contract details and/or QoS indicators. The telecommunication device, once having received a particular service or signaling as a result of an execution of user-trading, stores the data while being served and later transmits them to a party that is specified within the contract.

A requested signaling can be a direct or even an indirect service and any form of data transmission. Especially a signaling may but does not have to be a complete telecommunication session, i.e. signaling may concern one or only some of many aspects enabling such a telecommunication session. Examples for signaling comprise voice call, data transmission, providing control channels (including synchronization or the provision of scrambling sequences), restricting to the use of specific codes, restricting to the use of specific scrambling sequences and providing access to the clearing layer, so that a device that exits user trading can send its QoS parameters and contract details for clearing.

The various devices and methods of the invention do not only apply to current telecommunication technology. Rather, it is implementable into any form of communication network. In particular, the ad-hoc organization of flexible on-demand network topologies is facilitated by using the built-in market structure of the present invention.

The various devices and methods of the invention better meet the specific needs of mobile networks by allowing an on-demand setup of service agreements.

In an exemplary embodiment of the method according to the invention, a service-requesting node may request a service from a further node, indicating that a yet further node may be able to provide said service, and the method is executed between the further node and the yet further node. If the yet further node sends ACC to the further node, the service is provided from the yet further node towards the service requesting node.

The system of the invention comprises in one exemplary embodiment a billing systems able to store and send data in a possibly encrypted way, that data including contract details as well as QoS indicators. The billing system may be part of a telecommunication device which, once receiving a particular service as a result of an execution of UT, stores QoS indicators while being served and later transmits them to a party that is specified within the contract.

In an exemplary embodiment according to the invention, an interface enables a possibly periodic readout of the outcomes of the protocol, and of the billing system.

One or both of the nodes may act as service broker nodes on behalf of a network.

In an exemplary embodiment according to the invention, a mobile device is ordered by its carrier to detect other networks, carry out QoS measurements, report back to its carrier and then potentially being handed over to one of the other networks using the UT protocol.

In another aspect of the invention, a first node may provide service to a second node by agreeing to take part in a measurement process with the aim of making a quality assessment of the radio environment within a geographical region.

An exemplary embodiment of the invention relates to a system and to a method for transferring resources (e.g. radio resource blocks) from one operator's base station, radio network controller or radio access network to another operator's base station, radio network controller or radio access network. In one particular embodiment of the method the transfer of resources occurs in a local neighborhood of the original operator's base station, radio network controller or radio access network.

The method and/or the system may comprise using an interface between the control units and a program (or processor, or computer, or computing unit) that transmits bids and offers to other control units via the interface The method and/or the system may comprise using an interface between the program or/and the control unit. The method and/or the system may comprise using an interface between the end users and the control units. The method and/or the system may comprise using an interface between the control units and core network. The method and/or the system may comprise using an interface between the core network and sub-ledger of the public land and mobile network (PLMN) and using a processor for processing trades at the sub-ledger of the PLMN. The method and/or the system may comprise using an interface between processors of multiple PLMNs.

Such a system and/or method will be advantageous, e.g., in situations where the transmission between network nodes is mostly line of sight and disturbances arising e.g. from multipath propagation are relatively insignificant to the line of sight components.

In accordance with an embodiment of the present invention, tradeable communication resource comprises, e.g,
i. frequencies,
II. code books,
iii. beamforming vectors,
iv. channel inversion matrices,
v. interleavers and/or
vi. decoding strategies.

Trading may particularly occur in a market environment. This substantially eliminates, or at least reduces, disadvantages and problems associated with conventional exchange approaches for spectrum related transactions.

According to a further exemplary embodiment of the present invention, a method is provided for facilitating trades involving radio resources. The method of the further exemplary embodiment comprises transmitting information associated with radio resource assets from one control unit to another control unit of another operator along with communicating with an end user that consumes the data. Advantageously but not necessarily, the transmission mechanism can be accessed by any control unit (not only the seller or an addressed potential buyer) in order to identify a potential radio resource asset.

In one particular exemplary embodiment of the invention, the method further comprises utilizing the data communicated by the control unit in a registration process. The registration process could be utilized for more involved trades e.g. a swap, an optional lease, an optional sale, an optional transfer, or an optional purchase of the selected radio resource asset. Examples of such trades could be frequency spot exchanges, forwards, futures contracts, options (path dependent and non-path dependent), swaps etc.

In another particular exemplary embodiment of the invention, a virtual exchange platform is provided for facilitating trades involving radio resource assets. The virtual exchange platform is configured for providing a transmission mechanism to transmit information associated with at least one radio resource asset that includes virtual rights to be afforded to a holder of the radio resource asset. The transmission mechanism can be accessed by any control unit for any operator in a particular local neighborhood. Optionally, the transmission mechanism may be utilized to secure a radio resource asset at a designated time interval in the future (similar to a forward or futures contract).

Under the present invention, the following are possible: Given four nodes:
1) A service-requiring Node being associated to a further node and the service-requiring node requiring one or more services. The further node may communicate with a yet further node in order to hand over some or all of the requested services. As an outcome of the protocol, The service-requiring node gets the negotiated services from the yet further node (ACC) or not (NACC or no reply).
2) The service-requiring node requiring one or more services. The service-requiring node negotiating with the further node and the yet further node in order to get the services. The service-requiring node receiving none, some or all services, some from the further node and none, some or all of the services from the yet further node.
3) The service-requiring node being associated to the further node and requiring one or more services. the further node communicating to the yet further node and 300 with the aim of the yet further node providing at least one of the services to the service-requiring node. As part of the protocol, the yet further node sending pilot signals to the service-requiring node. The service-requiring node measuring the signals in order to find out whether the yet further node is able to deliver the service. As a result of the protocol, the yet further node delivering none, some or all of the services to the service-requiring node.
4) the yet further node being able to detect the presence of the service-requiring node. the yet further node starting the UT protocol towards the further node with the aim of being elected to provide service to the service-requiring node.
5) 300 being associated to the further node. The service-requiring node being able to detect the yet further node with the aim of finding out whether the yet further node could potentially provide different service than the further node, for example 4G instead of 3G. In the former case, the service-requiring node signaling this to the further node. the further node being able to use the UT protocol with the yet further node, and as a result the service-requiring node possibly receiving the different service.
6) All these cases including the possibility to find out whether an agreed-upon service has been delivered. Therefore, at least the service-requiring node being able to store QoS indicators and at least one other node being able to read them and check for violations. The at least one other node may even be equal to the further node. The execution of the protocol may lead to the yet further node having the added duty of transferring the (possibly encrypted) QoS indicators from the service-requiring node to the further node at predefined events.
7) All these cases including the possibility of using additional terminology being specified in another protocol. Said other protocol specifying the exchange of resources being necessary to deliver telecommunication services. For example in the situation described under 3), the requested service may be 4G connection. the yet further node may agree to provide said service conditioned on multiple events, one of the events being that the further node grants additional rights to use resources that are legally bound to be used only by the further node (or the network being represented by the further node).

The invention claimed is:

1. Method for managing signaling duties, the signaling duties concerning a requested service requested by users assigned to nodes in a communication network, wherein each node comprises a resource management, the method comprising: using resource requirements of at least one signaling duty for allocating corresponding communication resources of one of the nodes, the signaling duty for being assigned to a different, further node and the one node being capable for carrying out the at least one signaling duty, using the one node and the further node for determining a compensation and providing the compensation to said one node wherein the compensation concerns at least one different service which at least differs in a required data rate characterized in that a ratio of the data rate of the at least one different service to that of the requested service equals a proportionality factor times a ratio of the service duration of the requested service to that of the at least one different service and wherein the proportionality factor depends on cumulative resource requirements of further services being or being to be provided at least partly contemporarily with the requested service such that resource occupation occurring simultaneously with the requested service is taken into account.

2. The method of claim 1 wherein the at least one different service differs only in the starting time.

3. The method of claim 2 wherein the service is requested from and agreed to by the further node, the method further comprising determining said one node.

4. The method of claim 1 wherein the service is requested from and agreed to by the further node, the method further comprising determining said one node.

5. The method of claim 4 wherein determining the one node comprises communicating a request message requesting carrying out of the signaling duty from the further node to the one node and communicating an acceptance message indicating acceptance of the communicated request from the one node to the further node.

6. The method of claim 5 wherein the request message comprises a suggestion suggesting a compensation which is accepted by the acceptance message.

7. The method of claim 5 wherein determining the one node comprises communicating a suggestion message suggesting a compensation from the one node to the further node in response to the request message and communicating an acknowledgement message indicating acknowledgement with the suggested compensation from the further node to the one node.

8. A system comprising a node for a communication network, the node comprising: a processor configured for managing available communication resource of the node and adapted for using resource requirements of signaling duties of a requested service requested by a user assigned to a different, further node for allocating corresponding communication resource in exchange for a compensation received from the different, further node, the processor being configured for at least one of: suggesting the compensation to the further node or accepting a suggested compensation suggested by the further node wherein the compensation concerns at least one different service which at least differs in a required data rate characterized in that a ratio of the data rate of the at least one different service to that of the requested service is proportional, by a proportionality factor, to a ratio of the service duration of the requested service to that of the at least one different service and wherein the proportionality factor depends on cumulative resource requirements of further services being or being to be provided at least partly contemporarily with the requested service such that resource occupation occurring simultaneously with the requested service is taken into account.

9. The system of claim 8, wherein the processor is configured for allocating communication resource in response to accepting a corresponding request for taking over the signaling duty, the request being received in a request message received from the further node.

10. The system of claim 9, wherein the request message comprises a suggestion suggesting the compensation which is accepted by the acceptance message or wherein the further node comprising a processor that is configured for communicating the suggested compensation to the node in response to the request message.

11. The system of claim 10, further comprising an end user device for a communication network, the device being configured for determining nodes of the network which are covering a geographical region in which the device is located and for requesting carrying out of a signaling duty from one of the determined nodes wherein a message requesting the signaling duty comprises a list of the other determined nodes.

12. The system of claim 9, further comprising an end user device for a communication network, the device being configured for determining nodes of the network which are covering a geographical region in which the device is located and for requesting carrying out of a signaling duty from one of the determined nodes wherein a message requesting the signaling duty comprises a list of the other determined nodes.

13. The system of claim 8, further comprising an end user device for a communication network, the device being configured for determining nodes of the network which are covering a geographical region in which the device is located and for requesting carrying out of a signaling duty from one of the determined nodes wherein a message requesting the signaling duty comprises a list of the other determined nodes.

14. The system of claim 13, further comprising means for communicating to the other determined nodes a request message requesting carrying out of the signaling duty on behalf of the one determined node and for communicating an acceptance message indicating acceptance of the communicated request from at least one of the other nodes to the one node.

* * * * *